Jan. 1, 1952 G. L. MILLER 2,580,813
APPARATUS FOR USE WITH TRACTORS AND CULTIVATORS
Filed Oct. 13, 1945 2 SHEETS—SHEET 1
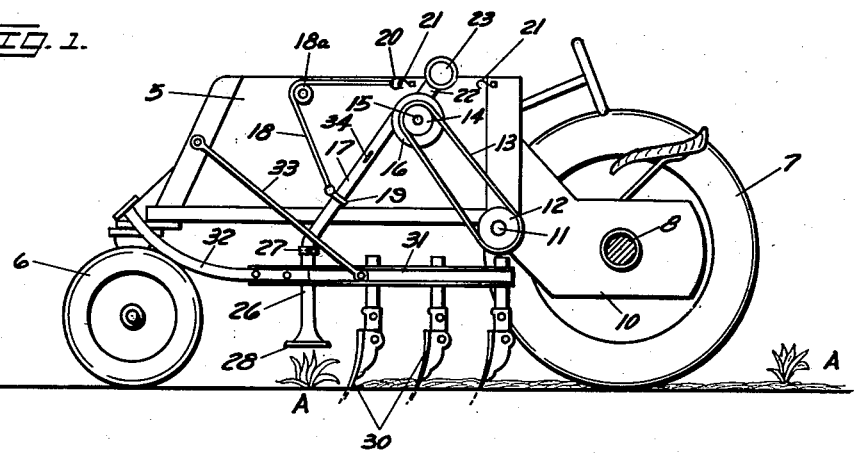
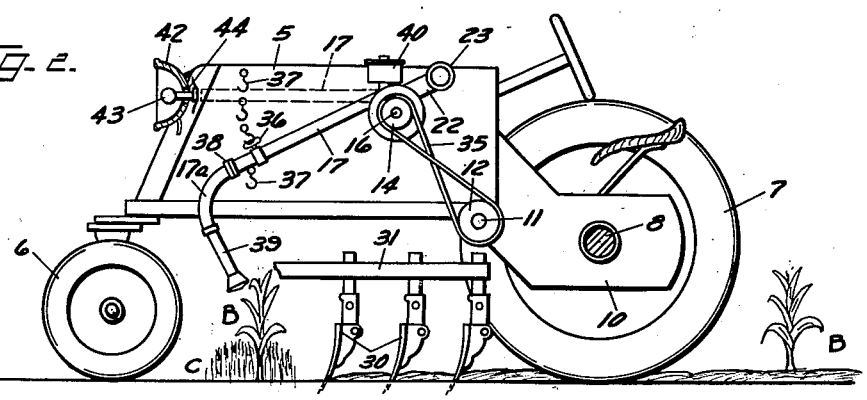
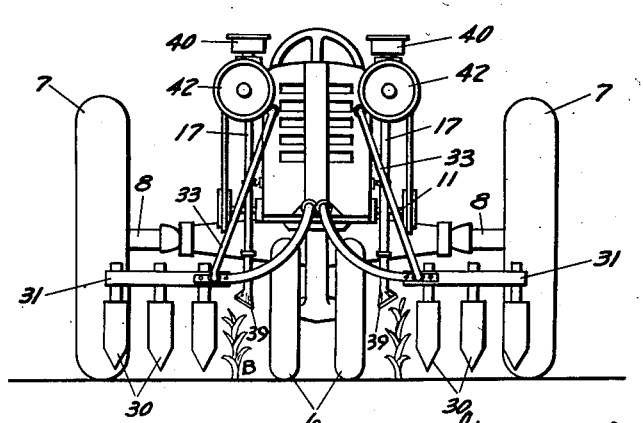
INVENTOR.
Gustave L. Miller
BY Walter N. Haskell.
his Attorney.

Jan. 1, 1952 G. L. MILLER 2,580,813
APPARATUS FOR USE WITH TRACTORS AND CULTIVATORS
Filed Oct. 13, 1945 2 SHEETS—SHEET 2
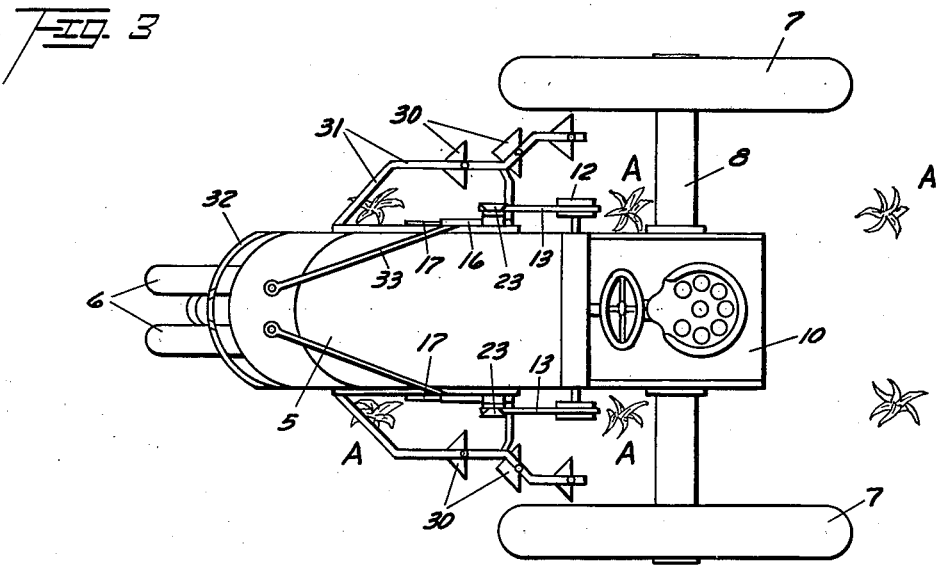
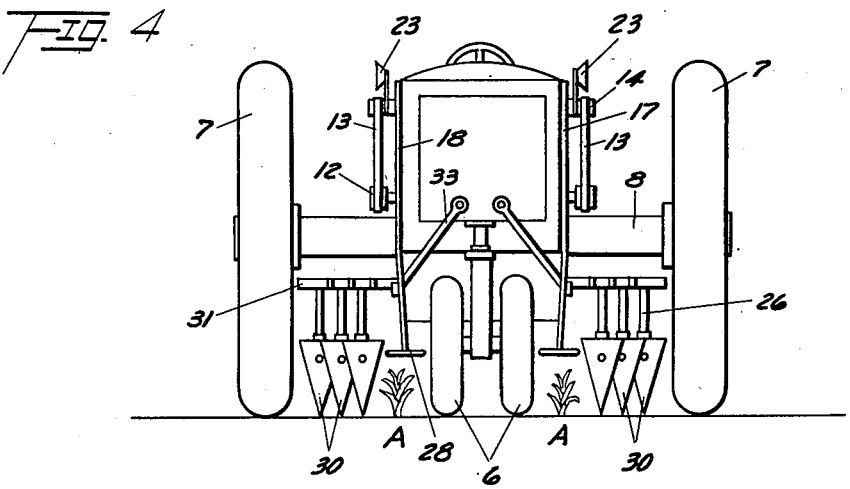
INVENTOR.
Gustave L. Miller.
BY Walter N. Haskell.
his Attorney.

UNITED STATES PATENT OFFICE 2,580,813

APPARATUS FOR USE WITH TRACTORS AND CULTIVATORS

Gustave L. Miller, Geneseo, Ill.

Application October 13, 1945, Serial No. 622,186

3 Claims. (Cl. 97—192)

My invention has reference to attachments for farm tractors, such as are used in the cultivation of corn, and is more specially related to the use of a tractor during the cultivating period. It comprises an attachment to the tractor, and can be driven from power devices with which the tractor is already equipped.

One of the purposes of the invention is to apply a suction force to the young plants just ahead of the cultivator blades, to raise any of the corn blades that may be lying down, and in danger of being covered with the earth. This is done by means of an apparatus including a blower, or other wind producing machine, with a nozzle attachment for passing over the young plants, in near proximity thereto. It is designed to be used in this way when the young corn is about the height for the first plowing with cultivators, and to hold the young plants and shoots in erect position until the shovels pass, and the corn is supported by a small quantity of earth. This is somewhat similar to the purpose mentioned in Letters Patent of the United States No. 1,166,144, issued to myself Dec. 28, 1915, for an Attachment for Cultivators.

In this first tilling of the crop the instrument is also effective in sucking from the young plant injurious insects, such as chinch bugs, corn borer moths, and the like. It will also pull up some of the younger weeds about the plants, by force of the air.

In later operations of the cultivator, with the corn a foot or more high, the direction of movement of the blower can be changed, and a current of air directed against the still young corn, tending to support the same against the work of the oncoming shovels, until again partially covered with the earth. The force of the air current also operates to pack down the young weeds about the bases of the corn plants, just ahead of the shovels, so that the weeds are well covered by the ridges of dirt thrown up by the shovels. For this operation the nozzles are carried at a greater height above the ground than for that first described above. At this stage of the cultivating operation the apparatus can also be employed as a spraying or dusting device, for applying to the young leaves of the corn some form of insecticide, such as D. D. T. for the killing of corn borer moths or other insects before referred to.

Before the corn is above the ground it is sometimes the practice to use the tractor during hours of darkness or semi-darkness, in disking or other operations, the work being aided by head-lights on the tractor, and the present invention can be combined with the lure of such head-lights to draw into the blower moths and other insects the larvae of which are already haunting a field.

The above named, and other features and advantages of the invention will more fully appear from the following specification, reference being had to the accompanying drawings, in which:

Figure 1 is a side elevational view of a tractor with one form of the invention applied thereto.

Figure 2 is a view similar to Figure 1 with a modified form of the invention applied to the tractor.

Figure 3 is a top view of the machine shown in Figure 1.

Figure 4 is a front view of Figure 1.

Figure 5 is a view similar to Figure 4 of the modified form of the invention shown in Figure 2.

In the last four figures the corn plants are shown at a relatively greater height than in Fig. 1, and with the nozzle apparatus in a shifted position to conform therewith.

The reference number 5 indicates a farm tractor of common construction, having a pair of steering wheels 6, and traction wheels 7, one of which is removed, rotatable on an axle 8, mounted in a rearward extension 10 of the tractor.

Supported at the side of the tractor is a shaft 11, corresponding with the power shaft of the tractor, upon which is a pulley 12, connected by a belt 13 with a pulley 14 on a shaft 15, journalled on the side of the tractor. Rockingly mounted upon said shaft is a blower casing 16, containing a rotary fan mounted on the shaft 15 (not shown in the drawing), and receiving rotation from said shaft. Projected from the outer part of the blower is a pipe 17, supported by a cable 18, one end of which is connected with a collar 19 on the pipe, and the other end of which is fitted with a ring 20, for attachment to one or other of hooks 21 on the tractor, for holding the pipe in adjusted positions, vertically. The up and down movement of the pipe 17 is made possible by the rocking movement of the casing 16, to which said pipe is secured at its upper end. Opposite to the upper end of the pipe 17 is a short pipe 22, turned to one side of the tractor, and fitted with a mouth 23. As a matter of convenience the shaft 11 may comprise the power shaft of the tractor, which is commonly rotated in a direction contrary to that of the traction wheels. In the showing in Fig. 1 this would result in a reverse movement of the fan, with a suction action in the pipe 17, and discharge through the mouth 23.

Fixed to the lower end of the pipe 17 is a short hose section 26, preferably attached by means of a bayonet slot and pin joint at 27, permitting a detachable connection of the hose section with the end of the pipe. At the lower end of the section 26 is a nozzle 28, of elongated form, and shown just above a young plant, A, as of corn, and just ahead of the inner one of a gang of cultivator shovels 30, supported from a beam 31, carried by the tractor by means of a frame 32 and rod 33, attached at the front thereof. The nozzle 28 passes sufficiently near the young plant to cause the leaves to be drawn upwardly by the suction in the pipe 17 and nozzle section to prevent any of the young leaves from being covered by the earth, as the shovels pass along, and until some of the earth has been deposited about the roots.

The mechanism above described is duplicated on the other side of the tractor so that the two rows of corn that are being cultivated are not only in proximity to the inner pair of shovels 30, but also within convenient range of the pair of nozzles 28, which for this purpose are positioned at a relatively low point near the young plants. The degree of suction may be controlled by means of a damper in the pipe 17, the position of which may be adjusted by a handle at 34.

In Fig. 2 is shown a similar tractor 5, supported by wheels 6 and 7, and fitted with a rotatable shaft 11 at the side. A blower 16 is also shown, similar to the one in Fig. 1, driven from the shaft 11 by means of pulleys 12 and 14, connected by a cross-belt 35. The blower is also fitted with a pipe 17 and intake 22, with a mouth 23 at one side. With the shaft 11 rotating in the same direction as the shaft of that numeral shown in Fig. 1, the movement of the blower is reversed, with a force of air outwardly thru the pipe 17, and drawn in thru the intake 22. The pipe 17 is supported by a collar and ring 36, connected with one of a series of hooks 37 on the tractor, by means of which the pipe can be held in adjusted positions, vertically. The pipe has a short curved section at 17a, with a jointed connection at 38, and with the end of this last section is connected a flexible nozzle section 39, of the sprinkler type. The flexible nozzle sections can be carried just above the rows of corn, or a little at the side thereof, with the nozzles properly directed.

This last-named apparatus is intended to be used at the time of a second or later cultivation of the corn, when it is a foot or more in height, as indicated at B in Fig. 2, to partially support the plant while the earth is being deposited against the same by the inner of a gang of shovels 30, supported from a beam 31, partly broken away, and similar to the shovels shown in Fig. 1. In addition to bracing the corn, the stream of air from the nozzle tends to pack down the young weeds about the roots of the corn, as indicated at C, just ahead of the shovels, with the result of the weeds being well covered by the ridge of earth.

The discharge pipe can be raised or lowered as desired, to conform to the height of the corn, and held in such adjusted position by the hooks 37 as mentioned.

In the last-named operation of the blower apparatus, it can also be employed for spraying or dusting upon the young plants an insecticide, such as D. D. T. for the killing of larvae, moths, or other insects destructive to the young corn, and making their abode therein. For this purpose there is mounted on the blower a container 40, from which small quantities of the insecticide can be discharged thru an opening into the blower, to enter the air stream thereof.

In Fig. 2 is also shown a head-light 42, with a lamp bulb 43 held therein, and an opening at 44 encircling the neck of the bulb. By disconnecting the extra joint and nozzle joint of the pipe, and elevating it into horizontal position, as shown in broken lines, and reversing the movement of the rotary fan, a current of air will be drawn in from the light, carrying with it moths and bugs which are attracted by the light. These are drawn into the blower and destroyed therein, after which they are blown out.

What I claim, and desire to secure, is:

1. In combination with a tractor and a power shaft carried thereby, a blower casing rockingly mounted on said tractor, a rotary fan in said casing, an air pipe connected with said casing, means for rotating said fan from said power shaft for causing a current of air to flow into and through said pipe, a nozzle connected to the end of said pipe, cultivating devices carried by said tractor closely behind said nozzle, said nozzle being so supported in proximity to a row of plants that the current of air passing therethrough acts to support a plant during cultivation, said cultivating devices cultivating each plant coincidently with the action of the current of air in said nozzle on each said plant.

2. A combination as recited in claim 1, in which the nozzle is so positioned and the current of air is so directed that there is a suction which acts to hold up the leaves of the plant.

3. A combination as recited in claim 1, in which the nozzle is so positioned and the current of air is so directed that there is a stream of air directed against the plant and which acts to brace the plant and to pack down weeds near the plant.

GUSTAVE L. MILLER.

REFERENCES CITED

The following references are of record in the file of this patent:

UNITED STATES PATENTS

| Number | Name | Date |
| --- | --- | --- |
| 640,829 | Strobach | Jan. 9, 1900 |
| 752,790 | Miller | Feb. 23, 1904 |
| 913,205 | Ellithorp | Feb. 23, 1909 |
| 1,035,012 | Hoselton | Aug. 6, 1912 |
| 1,108,882 | Bartlett | Sept. 1, 1914 |
| 1,452,918 | LaCroix | Apr. 24, 1923 |
| 1,495,098 | Nelson | May 20, 1924 |
| 1,566,925 | Rokohl | Dec. 22, 1925 |
| 1,586,123 | Sikorski | May 25, 1926 |
| 2,336,577 | Singleton | Dec. 14, 1943 |
| 2,346,270 | Nisbet | Apr. 11, 1944 |